US010120922B2

(12) United States Patent
Henderson et al.

(10) Patent No.: US 10,120,922 B2
(45) Date of Patent: *Nov. 6, 2018

(54) EXTENDED CORRELATION METHODS IN A CONTENT TRANSFORMATION ENGINE

(71) Applicant: Boomerang Technology Holdings, LLC, Irving, TX (US)

(72) Inventors: Bruce R. Henderson, Escondido, CA (US); Anthony Gibson, Irving, TX (US)

(73) Assignee: Boomerang Technology Holdings, LLC, Irving, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/479,586

(22) Filed: Apr. 5, 2017

(65) Prior Publication Data
US 2017/0206257 A1    Jul. 20, 2017

Related U.S. Application Data

(63) Continuation of application No. 15/184,544, filed on Jun. 16, 2016, now Pat. No. 9,646,052, which is a
(Continued)

(51) Int. Cl.
G06F 17/30    (2006.01)
G06F 7/00    (2006.01)
G06Q 10/10    (2012.01)

(52) U.S. Cl.
CPC .. *G06F 17/30569* (2013.01); *G06F 17/30241* (2013.01); *G06F 17/30489* (2013.01);
(Continued)

(58) Field of Classification Search
CPC .......... G06F 17/3071; G06F 17/30864; G06F 17/30598; G06F 17/30705; G06F 17/30265
(Continued)

(56) References Cited

U.S. PATENT DOCUMENTS 6,636,864 B1 * 10/2003 Owen, Jr. ......... G06F 17/30067
7,003,560 B1    2/2006 Mullen et al.
(Continued)

FOREIGN PATENT DOCUMENTS

WO    0175664 A1    10/2001
WO    03081475 A1    10/2003

OTHER PUBLICATIONS

Xiu et al., "The Research of Web Based Data Warehouse Using XML", IEEE, vol. 5, Oct. 29, 2001, pp. 42-47.
(Continued)

*Primary Examiner* — Usmaan Saeed
*Assistant Examiner* — Raquel Perez-Arroyo
(74) *Attorney, Agent, or Firm* — Volentine, Whitt & Francos, PLLC

(57) ABSTRACT

A method for communicating data includes customizing content transformation agents for different source data repositories, and providing the content transformation agents to the different source data repositories. First-stage data feeds from the different source data repositories are constructed in a neutral format by dynamically selecting and transforming source data in the different source data repositories into the neutral format. The first-stage data feeds are sent to an aggregation agent which generates, based on criteria specified by a user, a second stage data feed as a composite of selected source data from the first-stage data feeds.

20 Claims, 18 Drawing Sheets

Related U.S. Application Data continuation of application No. 13/951,887, filed on Jul. 26, 2013, now Pat. No. 9,384,235, which is a continuation of application No. 11/773,292, filed on Jul. 3, 2007, now Pat. No. 8,521,740, which is a continuation of application No. 11/397,076, filed on Apr. 4, 2006, now abandoned.

(52) U.S. Cl.
CPC .. *G06F 17/30864* (2013.01); *G06F 17/30893* (2013.01); *G06Q 10/10* (2013.01)

(58) Field of Classification Search
USPC .......................................................... 707/737
See application file for complete search history.

(56) References Cited

U.S. PATENT DOCUMENTS

| | | | |
|---|---|---|---|
| 7,406,436 B1 | 7/2008 | Reisman | |
| 7,617,190 B2 * | 11/2009 | Wright | G06F 17/30489 |
| 7,702,995 B2 | 4/2010 | Sahota et al. | |
| 8,661,459 B2 * | 2/2014 | Gandhi | G06F 17/3089 |
| | | | 715/234 |
| 2002/0099563 A1 | 7/2002 | Andendorff et al. | |
| 2003/0208598 A1 | 11/2003 | Athey et al. | |
| 2005/0165615 A1 | 7/2005 | Minar | |
| 2005/0222931 A1 | 10/2005 | Mamou et al. | |
| 2006/0167860 A1 | 7/2006 | Eliashberg et al. | |
| 2006/0173985 A1 * | 8/2006 | Moore | G06F 17/3089 |
| | | | 709/223 |
| 2006/0259462 A1 | 11/2006 | Timmons | |
| 2007/0100959 A1 | 5/2007 | Eichstaedt et al. | |
| 2007/0116037 A1 | 5/2007 | Moore | |
| 2007/0156809 A1 | 7/2007 | Dickinson et al. | |
| 2007/0168367 A1 | 7/2007 | Dickinson et al. | |
| 2007/0220063 A1 | 9/2007 | O'Farrell et al. | |

OTHER PUBLICATIONS

International Search Report and Written Opinion of the International Searching Authority from Patent Cooperation Treaty Application No. PCT/US2008/068975, dated Sep. 22, 2008, pp. 1-14.
Miligan et al., "JBI Fuselet Definition Document—DRAFT", Airforce Research Laboratory, Joint Battlespace Infosphere Information Directorate, Feb. 24,2004, Version I.2, pp. 1-26.
Osgcorp.com, "Enterprise Information Portals—Trends and Progress", An OSG Technology White Paper, Oct. 2005.
Ponniah, Paulraj, Data Warehousing Fundamentals—A Comprehensive Guide for IT Professionals, Chapters 12 and 16, John Wiley & Sons, Inc., 2001.
Varde, Apama, "Data Warehousing and Data Extraction on the World Wide Web", WebTech99, pp. 1-10.
European Patent Office Search Report for European Patent Application No. 07251486.2, dated Jul. 13, 2007.
Koch, "Leverage Legacy Systems with a Blend of XML, and Java", www.javaworld.com, Oct. 2005, pp. 1-7.
Sullivan, "Search Engine watch", www.searchenginewatch.com, Apr. 2003, pp. 1-10.
Biever, "Create your Favorite Website, Automatically", NewScientist.com, Mar. 2006, pp. 1-2.
U.S. Appl. No. 15/184,544, filed Jun. 16, 2016.
U.S. Appl. No. 13/951,887, filed Jul. 26, 2013.
U.S. Appl. No. 11/773,292, filed Jul. 3, 2007.
U.S. Appl. No. 11/397,076, filed Apr. 4, 2006.

* cited by examiner

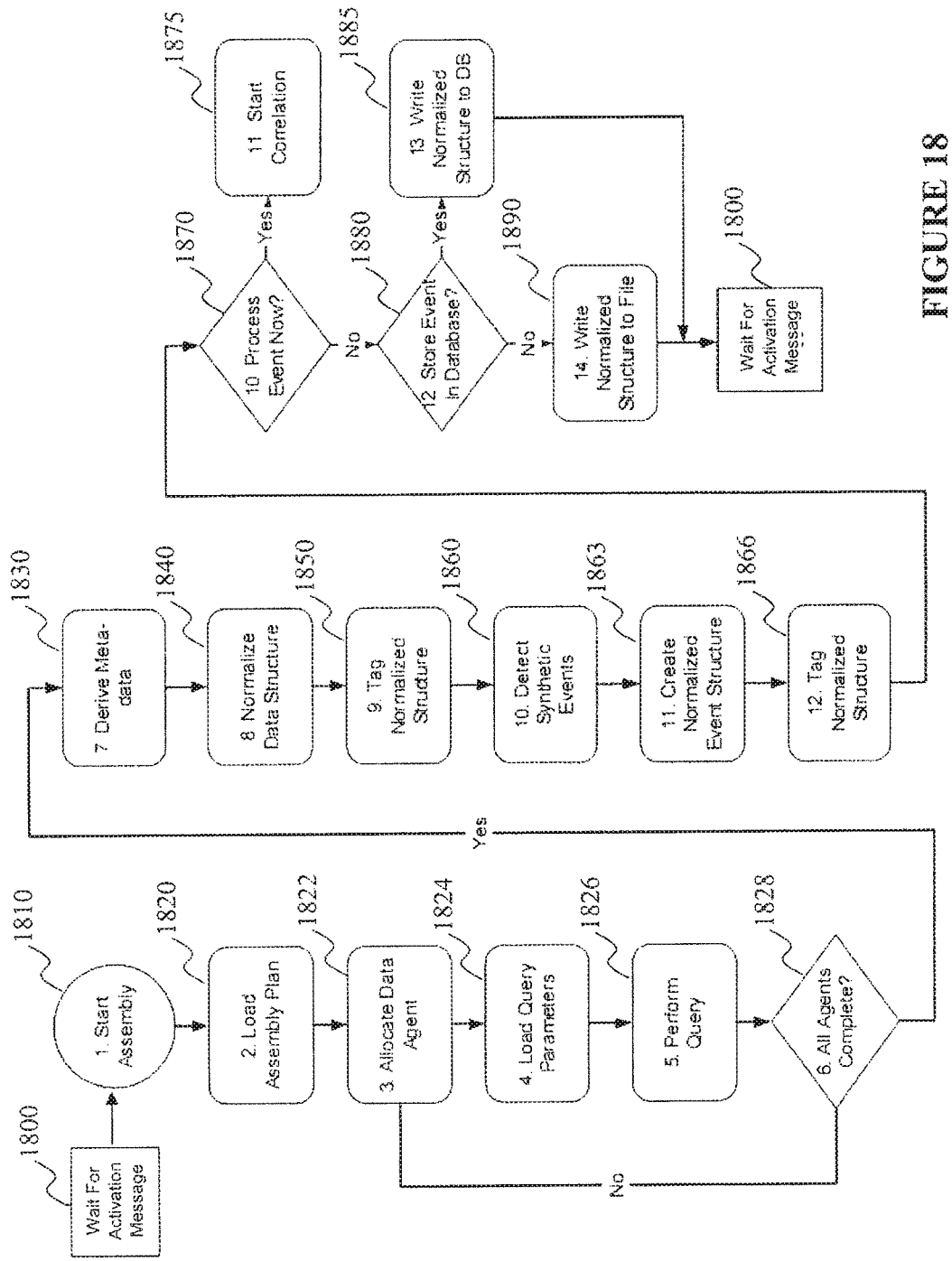

EXTENDED CORRELATION METHODS IN A CONTENT TRANSFORMATION ENGINE

CROSS REFERENCE

The present application is a continuation application of pending U.S. patent application Ser. No. 15/184,544, filed on Jun. 16, 2016, which is a continuation of U.S. patent application Ser. No. 13/951,887, filed on Jul. 26, 2013, now U.S. Pat. No. 9,384,235, issued on Jul. 5, 2016, which is a continuation of U.S. patent application Ser. No. 11/773,292, filed on Jul. 3, 2007, now U.S. Pat. No. 8,521,740, issued on Aug. 27, 2013, which is a continuation-in-part of U.S. patent application Ser. No. 11/397,076, filed on Apr. 4, 2006, the disclosures of which are expressly incorporated herein by reference in their entireties.

BACKGROUND

This invention relates generally to computer software, and more specifically to a method and system for allowing an application program to accumulate and present data in web-based content.

Many legacy systems exist for storing data which are not readily available or usable in many web-based applications. For example, a legacy system can include a database of inventory data for which it would be desirable to view, modify, analyze, or otherwise access using an Internet application such as a browser or portal, or some other type of application. However, the data in these legacy systems are not formatted in web-accessible or usable content such as Remote Site Syndication (RSS), eXtensible Markup Language (XML), or Hyper Text Markup Language (HTML). Additionally, the data within these legacy systems is extremely large and complex. Improvements in the method of extracting and presenting this data to web-based applications are needed to provide a simpler and more cost-effect tool for businesses to monitor and integrate their legacy systems.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 18 is a more detailed flowchart of the process steps 320-350 of FIG. 4 according to one embodiment.

DETAILED DESCRIPTION

The present disclosure relates generally to computer software applications, and more particularly, to a method and system for generating complex composite data that may be presented in human actionable form. It is understood, however, that specific embodiments are provided as examples to teach the broader inventive concept, and one of ordinary skill in the art can easily apply the teachings of the present disclosure to other methods and systems. Also, it is understood that the methods and systems discussed in the present disclosure include some conventional structures and/or steps. Since these structures and steps are well known in the art, they will only be discussed in a general level of detail. Furthermore, reference numbers are repeated throughout the drawings for the sake of convenience and clarity, and such repetition does not indicate any required combination of features or steps throughout the drawings.

Figure 1:
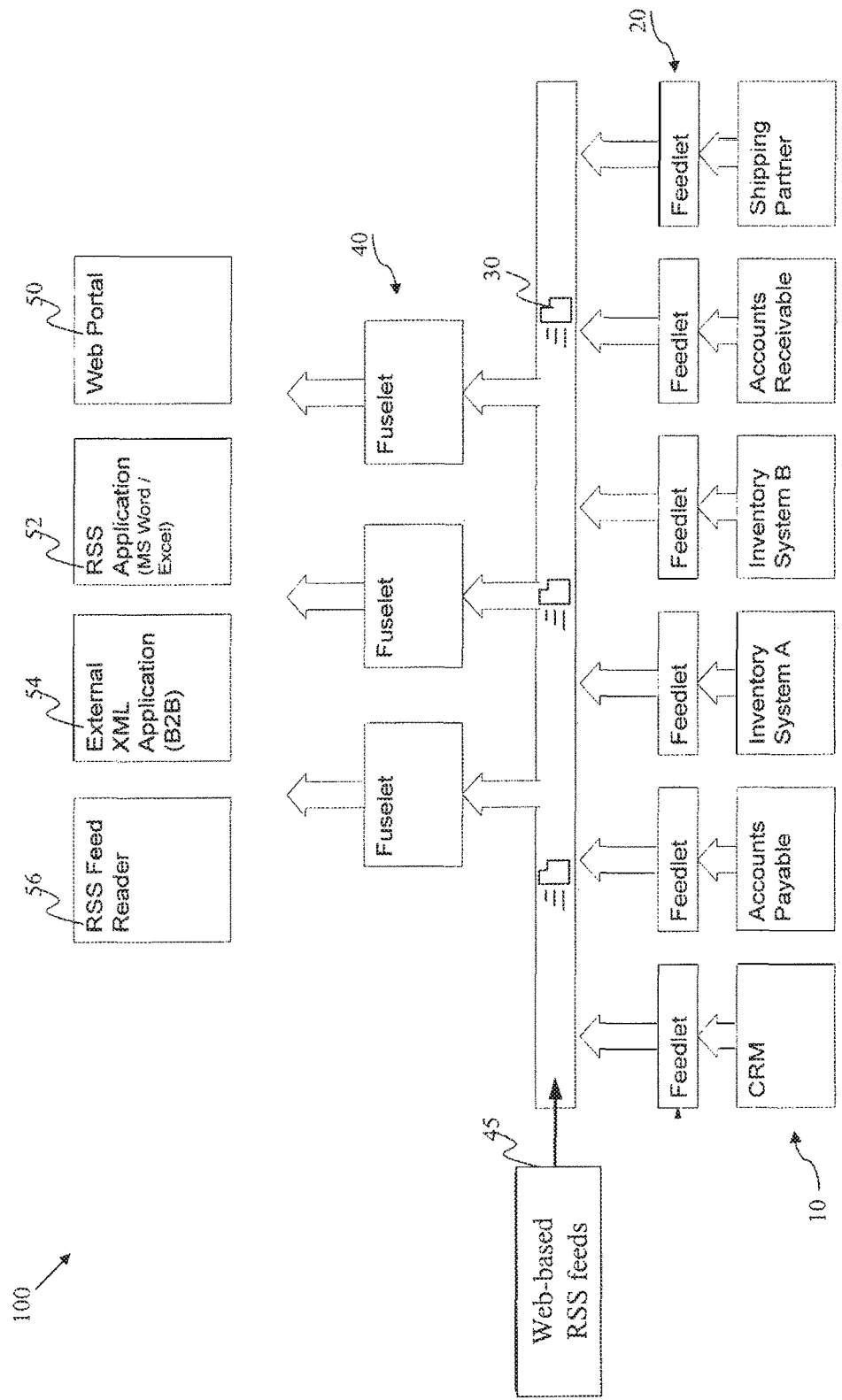
FIG. 1 is a block diagram of a system for generating complex composite data feeds, according to one or more embodiments of the present disclosure.

Referring now to FIG. 1, a system 100 for generating complex composite data feeds is shown. For the sake of example, the system 100 is shown in a typical multi-tiered structure. The system 100 includes a plurality of silos 10 comprising a variety of backend information systems (legacy databases) containing large amounts of raw data. These backend information systems may include a single defined data source such as a relational database (RDBMS). The information systems also may include message buss systems such as IBM's MQ series, a set of relational databases, and calls to existing application programming interfaces (APIs) over communication means such as sockets, common object request broker architecture (COBRA), and JAVA 2 enterprise edition (J2EE). It is understood that the type of backend information system may include any database that is not readily accessible or usable for web-based applications.

Continuing with the example, the silos 10 represent different information systems within a particular business, such as, customer relations management (CRM), accounts payable, accounts receivable, inventory systems A & B, and shipping partner. The plurality of silos 10 typically do not communicate and share data with each other. The plurality of silos 10 may interface with a plurality of FEEDLETS 20. The FEEDLETS 20 may communicate with these silos 10 using existing APIs or active queries. Even though one silo 10 is shown to interface with one FEEDLET 20, it is understood that one silo may interface with multiple FEEDLETs or that one FEEDLET may interface with multiple silos.

The FEEDLET 20 is a software component that transforms exiting data sources directly into web-accessible or usable content. This content or output data feed 30 of the FEEDLET 20 is usually in a RSS format. Additionally, the output data feed 30 may be static HTML content or XML data file. The output data feed 30 represents high value (or key pieces) data selected from the backend information systems. The high value data may depend on a particular business setting and may be based on what is most important to that business. Furthermore, the FEEDLET 20 may also perform transformation and correlation on the raw data to generate the high value data. The method of generating the output data feed 30 of the FEEDLET 20 will be explained in greater detail later.

The FEEDLET 20 runs as a stand-alone program that creates and writes these output data feeds 30 to a local or remote file system which is typically managed by a HTML web server for vending to other applications such as web browsers, server-side web portals, XML business-to-business (B2B) integration hubs, and XML/RSS aware applications on a desktop. The FEEDLET 20 runs on a periodic basis in order to refresh and update the contents of the output data feed 30 and allows for current view status of the backend information system. The execution of the FEEDLET 20 is through a batch mode process by which the FEEDLET periodically wakes up and performs a number of queries against the backend information system to generate the output data feeds 30. The output data feeds 30 may be fed into one or more FUSELETs 40. Alternatively, the output data feeds 30 may be fed into an application that is suitable for RSS, HTML, or XML format such as a web portal, RSS feed reader, RSS application (MS Word/Excel), or external XML application (B2B).

The FUSELET 40 is a software component that consumes a plurality of input data source feeds and generates complex composite data feeds by correlating, cross referencing, and re-synthesizing data elements within these data streams. The plurality of input data streams are typically in the form of RSS or XML feeds. The input data streams may come from FEEDLETS 20, web-based applications 45 that emit an RSS stream such as a news portal, a web-based inventory system, a web-hosted business system (e.g., FedEx package tracking), or an XML data system or integration hub. The complex composite data feeds generated by the FUSELET 40 is usually in a RSS format. Additionally, the complex composite data feed may also be static HTML content or XML data file. The method of generating the complex composite data feed by the FUSELET 40 will be explained in greater detail later.

The FUSELET 40 runs as a stand-alone program that polls the plurality of input data source feeds from local and remote web-hosted sites and generates the complex composite data feeds. The complex composite data feeds may be fed into an application that is suitable for RSS, HTML, or XML format such as a web portal 50, RSS application (MS Word/Excel) 52, external XML Application (B2B) 54, or RSS feed reader 56 browser. The complex composite data feeds are in human actionable form such that the information presented allows a customer to be able to view the information and take some action to improve its business. The FUSELET's 40 execution is typically triggered on a periodic basis in order to refresh and update the contents of the generated complex composite data feed with the current status of the monitored input data streams. The execution of the FUSELET 40 is through a batch mode process by which the FUSELET periodically wakes up and queries a web server that provides the input data source feeds and performs fusion to generate the complex composite data feeds. It is understood that higher level FUSELETs 40 may be implemented to receive the complex composite data feeds from lower level FUSELETs to generate new complex composite data feeds for publishing directly to the Internet.

Figure 2:
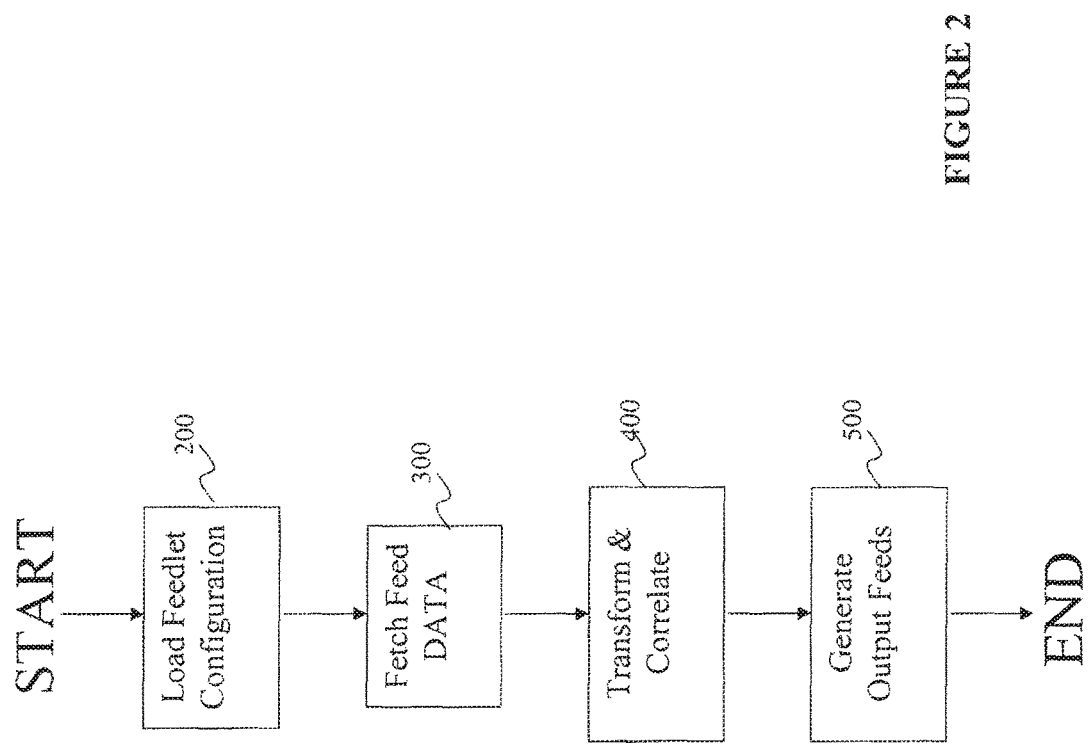
FIG. 2 is a simplified flowchart of an embodiment of a method for generating data feeds.

Referring now to FIG. 2, a simplified flowchart of a method for generating data feeds by the FEEDLET 20 (FIG. 1) is shown. Starting with step 200, the FEEDLET 20 may be loaded with configuration properties in order for the FEEDLET to execute properly. In step 300, the FEEDLET 20 fetches data from the existing backend information system 10. In step 400, the FEEDLET 20 transforms and correlates the fetched data. And in step 500, the FEEDLET 20 generates an output feed 30 (FIG. 1) representing the transformed and correlated data.

Figure 3:
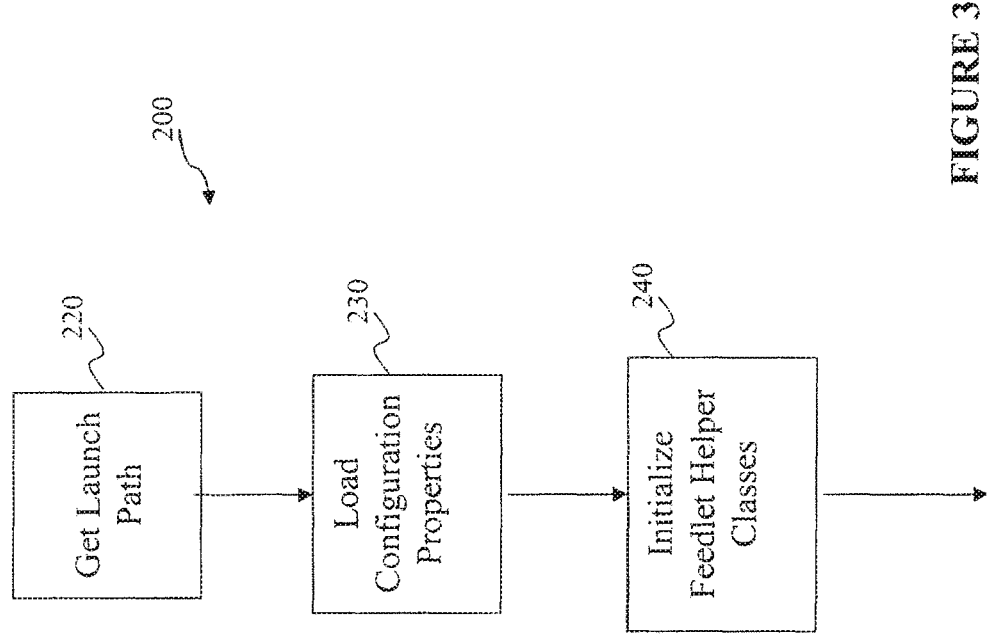
FIGS. 3-6 are more detailed flowcharts of the process steps in FIG. 2.

Referring now to FIG. 3, a more detailed flowchart of the process step 200 of FIG. 3 is shown. At step 220, the method starts by getting a launch path to the FEEDLET 20 for initial configuration. In step 230, the FEEDLET 20 may be loaded with configuration properties from a parameter specification data file during start up. This provides configuration on the location of the existing backend information system 10, the parameters for connecting or interfacing with the information system, and the authentication parameters that will be used as credentials with the information system. The configuration properties also define what types of output (e.g., RSS, HTML, or XML) the FEEDLET 20 will generate and a location of target file system directories for each output stream. These directories may include locally accessible storage, a document storage area of a web server, or a remote server's file system. In step 240, the FEEDLET 20 comprises internal components or helper classes that are initialized based on the configuration properties that were loaded. The FEEDLET 20 may call upon these helper classes to properly execute its software routines.

Figure 4:
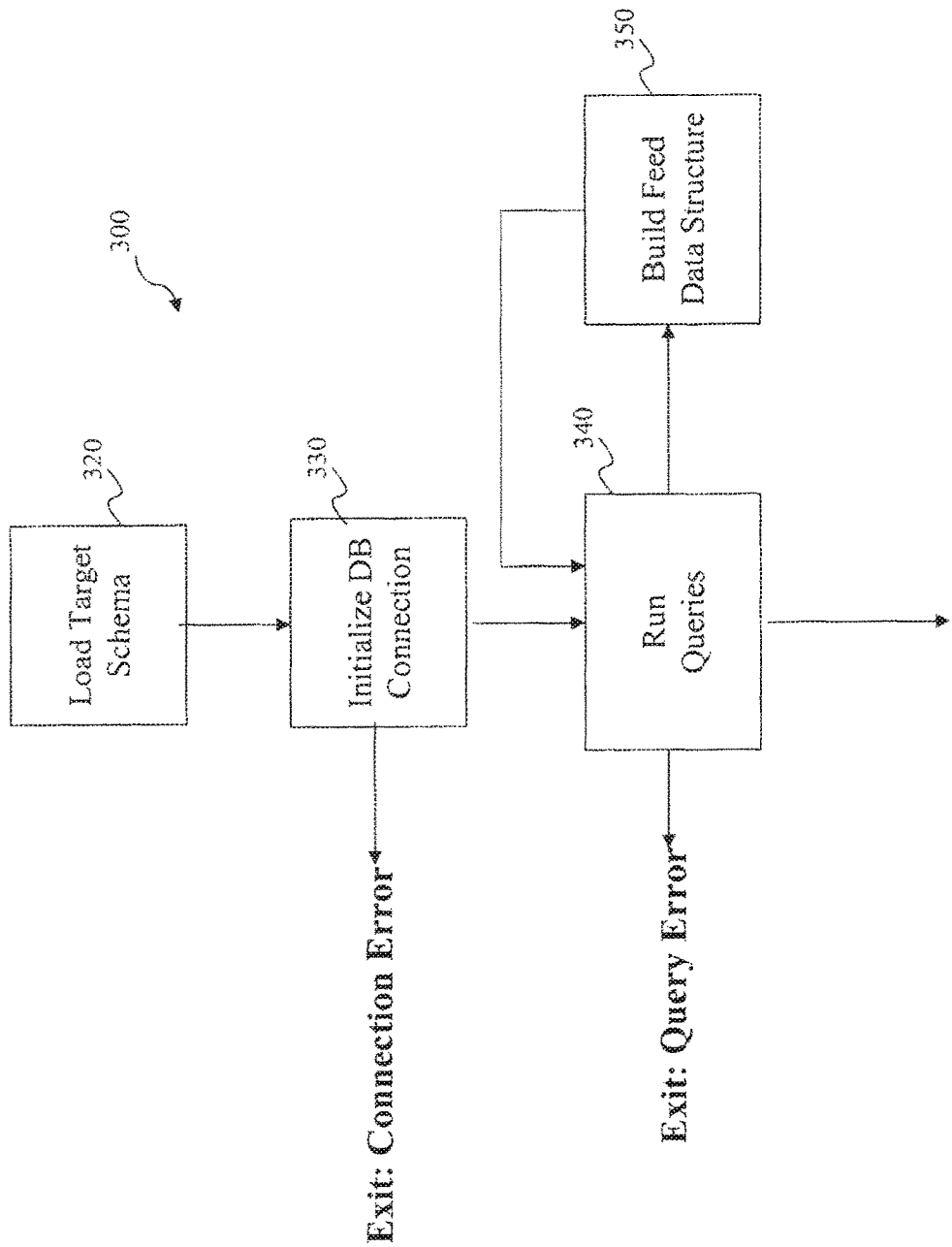

Referring now to FIG. 4, a more detailed flowchart of the process step 300 of FIG. 3 is shown. At step 320, the FEEDLET 20 may be loaded with a target schema, such as a target XML schema, to define a data structure comprising of key pieces of data that are selected when the FEEDLET 20 queries the existing backend information system 10. The target schema may be dynamically assignable so that changes to the data structure can made via the schema without having to completely rebuild the entire application. In step 330, the FEEDLET 20 initializes a connection to the information system 10 for data transfer. If the FEEDLET 20 is unable to connect to the information system 10, the FEEDLET will exit and transition to an error state. In step 340, the FEEDLET 20 performs one or more queries to fetch data from the information system 10. In step 350, the FEEDLET 20 builds the data structure according to the target schema. The data structure is temporarily stored in the FEEDLET's program memory. The FEEDLET 20 repeats this process until the data structure is complete and ready for content transformation and correlation.

Figure 5:
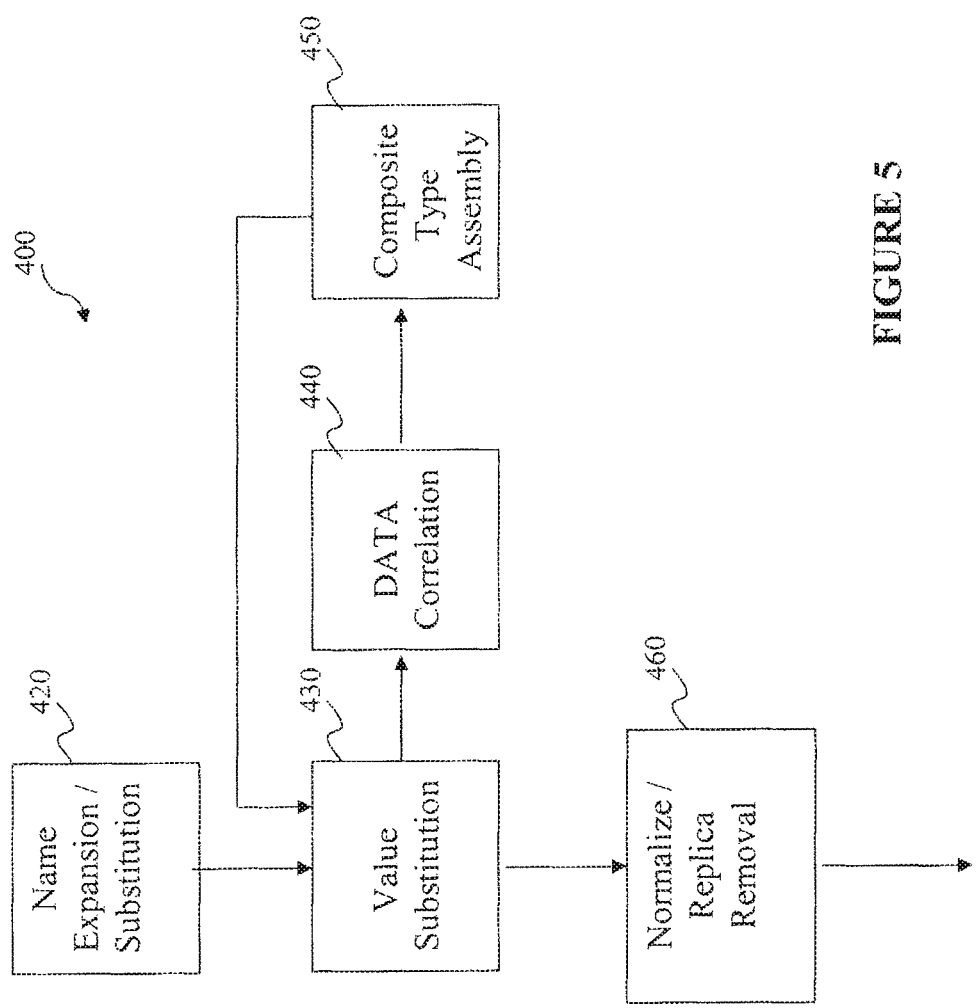

Referring now to FIG. 5, a more detailed flowchart of the process step 400 of FIG. 2 is shown. The data extracted and temporarily stored in the data structure is usually in a compressed format which substitutes repeating values with numeric or alphanumeric tokens. For the sake of example, in the gaming industry, integers "1," "2," and "3" within the data structure may represent customers that have player ratings of platinum, gold, and silver, respectively. At step 420, the FEEDLET 20 modifies the temporary data structure to expand these tokens into their text representations (or human actionable content) and replaces these tokens with the expanded values. In step 430, the FEEDLET 20 applies formatting and transformation to data that represents numerical values. For example, if the data represented monetary values in pennies, a value of 1244192 would be transformed to $12,441.92 and re-inserted into the temporary data structure. In steps 440 and 450, the FEEDLET 20 may perform data correlation by assembling new data types from the contents of the primitive data elements that were stored in the temporary data structure of process step 350 (FIG. 4). The FEEDLET 20 repeats this process with all the data in the temporary data structure. In step 460, the FEEDLET 20 may scan the temporary data structure to ensure that there are no duplicate entries for unique data elements and that each entry is in a conforming format according to the pre-defined target schema. Replica data elements are removed and non-conforming data elements are modified and replaced.

Figure 6:
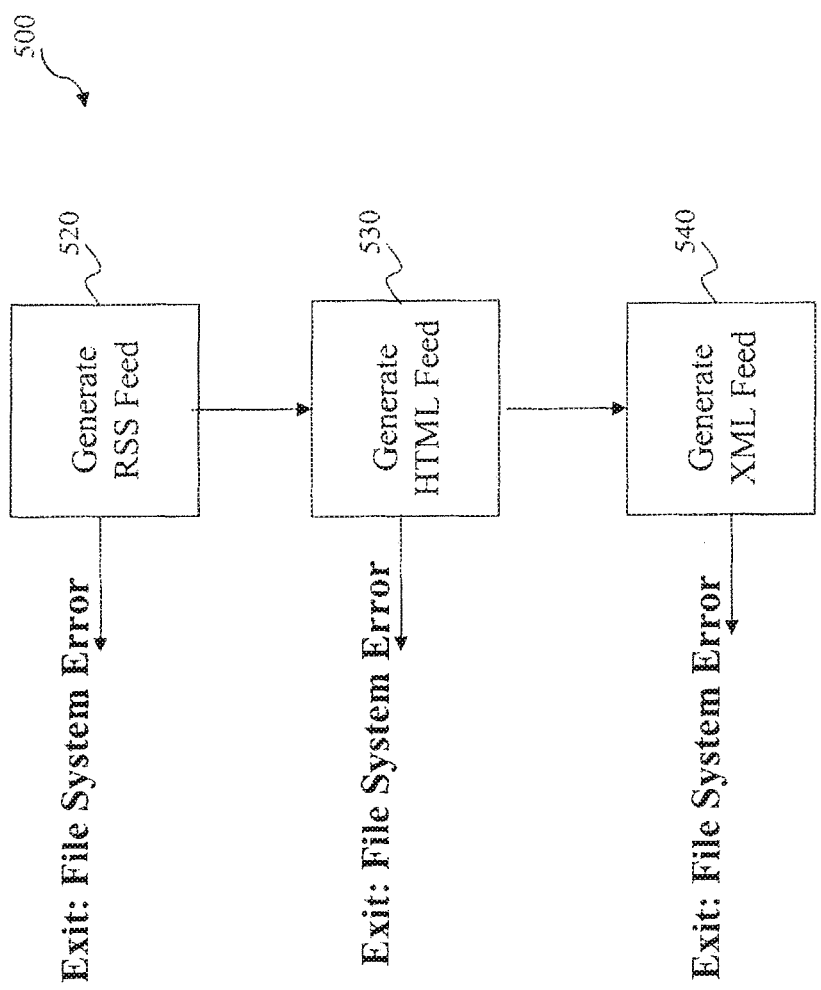

Referring now to FIG. 6, a more detailed flowchart of process step 500 of FIG. 2 is shown. At step 520, the FEEDLET 20 takes the transformed and correlated data structure and generates an RSS output feed. In step 530, the FEEDLET 20 takes the transformed and correlated data structure and generates a HTML output feed. In step 540, the FEEDLET 20 takes the transformed and correlated data structure and generates an XML output feed. However, the FEEDLET 20 may exit the application program if there is a file system error when generating any of the output feeds.

Figure 7:
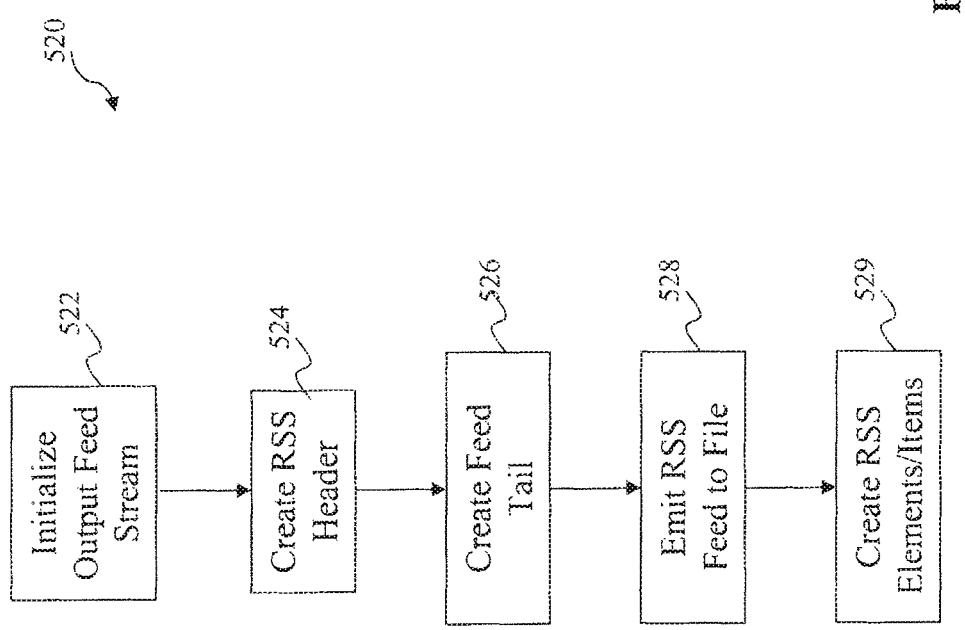
FIG. 7 is a flowchart of an embodiment of a method for generating an RSS feed in FIG. 6.

Referring now to FIG. 7, a more detailed flowchart of generating the RSS output feed of FIG. 6 is shown. In step 522, the FEEDLET 20 initializes an output feed stream for RSS. In step 524, the FEEDLET 20 creates a conforming RSS header that contains multiple meta-data elements about the feed and the manner of data/content of the feed. In step 526, the FEEDLET 20 creates a feed tail by constructing a RSS feed entry for each data element in the temporary data structure. In step 528, the FEEDLET 20 emits the RSS feed entry to the output feed file. The feed entry is typically generated from an XML template that the FEEDLET 20 loads from the file system. In step 529, the FEEDLET 20 creates the RSS feed element or item by taking the data values in the temporary data structure and substituting them into the XML template. The template may include HTML elements as well as other web-accessible content such as static graphics or images (JPEG or GIP files), dynamic web content, and XML steps.

Figure 8:
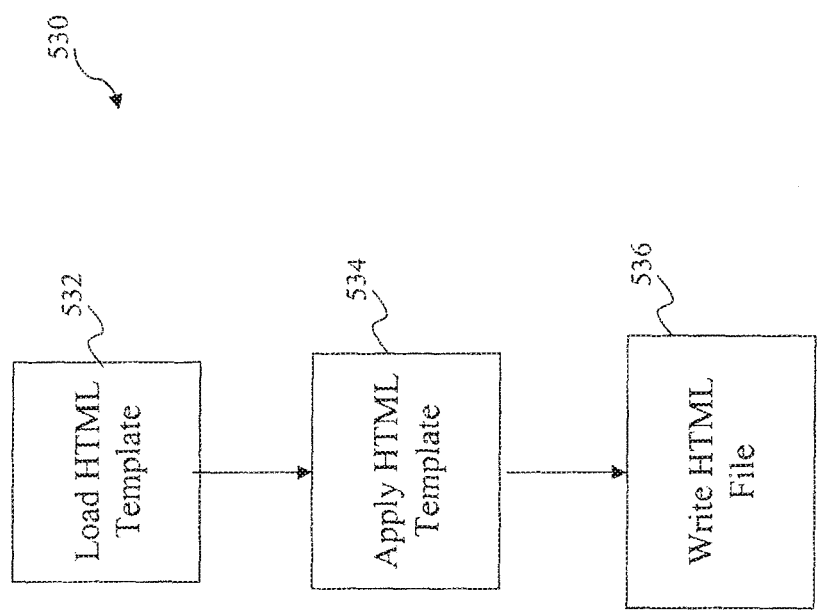
FIG. 8 is a flowchart of an embodiment of a method for generating an HTML feed in FIG. 6.

Referring now to FIG. 8, a more detailed flowchart of generating the HTML output feed of FIG. 6 is shown. The HTML output feed is typically a series of HTML static files stored in a specified directory. In step 532, the FEEDLET 20 may load an HTML template document from its configuration properties. In step 534, the FEEDLET 20 applies the HTML template to the temporary data structure. The data values of the temporary data structure are substituted for tokens in the HTML template document. In step 536, the resulting HTML document may be written to the specified directory. The directory is typically a part of a file system of a web server system such as Apache or Microsoft IIS.

Figure 9:
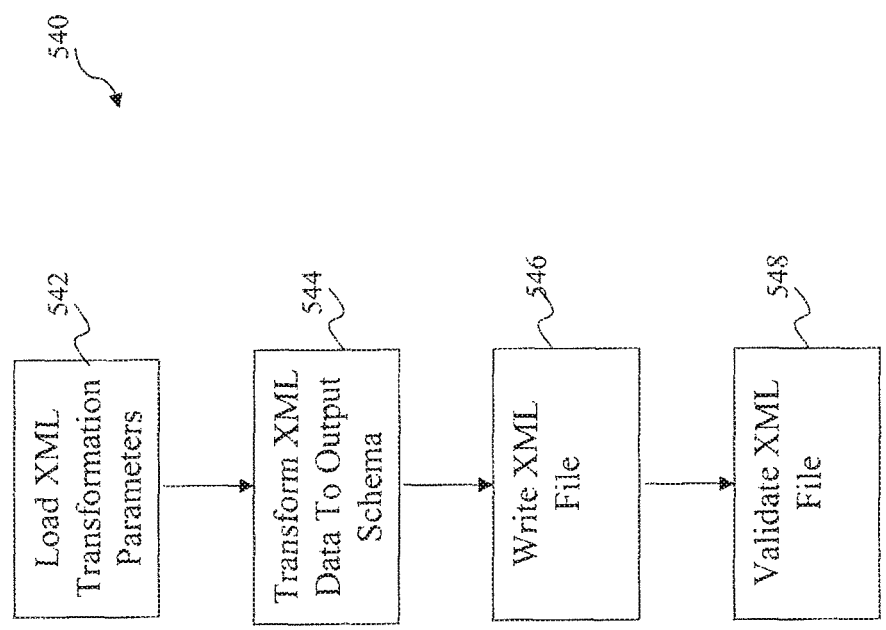
FIG. 9 is a flowchart of an embodiment of a method for generating an XML feed in FIG. 6.

Referring now to FIG. 9, a more detailed flowchart of generating the XML output feed of FIG. 6 is shown. The XML output feed is typically an XML document or file that represents the content of the temporary data structure. In step 542, the FEEDLET 20 loads XML transformation parameters from its configuration properties stored in memory. In step 544, the FEEDLET 20 transforms the data in the temporary data structure into a conforming XML schema using a common library, such as Java Architecture for XML Binding (JAXB). In step 546, the FEEDLET 20 writes the transformed data to the XML document in a specified directory. In step 548, the XML document may be validated to ensure that the data conforms to the XML schema.

The method of operation of the FUSELET 40 (FIG. 1) is similar to the FEEDLET 20 (FIG. 1). The descriptions of the flowcharts, FIGS. 2-9, generally apply to the FUSELET 40 with some variations which are noted below. Referring again to FIG. 3, at step 230, parameters of the FUSELET's execution are loaded from a parameters specification data file during start up. This provides configuration on the location of the input data sources and the associated URLs of their hosting web server, the means of connecting to these input data sources, and authentication parameters that the FUSELET 40 will use as credentials with these data sources. The configuration also defines what types of output the FUSELET 40 will produce (e.g., RSS, HTML, or XML) and the target file system directories for each output stream. These directories may be in locally accessible storage, a document storage area of a web server, or on a remote server's file system.

Referring again to FIG. 4, at step 330, the FUSELET polls the input data sources and gathers information for fusion. Typically, the FUSELET 40 is connected via the Internet to the web servers that host the source RSS or XML feeds. In some cases, this connection may be protected by password or other security measures and the FUSELET 40 may use the authentication parameters and credentials specified in the configuration file to access the input data feeds. The FUSELET 40 stores these input feed files from a remote host in a local cache in the host file system. A time stamp of the remote hosted feed file is compared to the feed file cached from the previous FUSELET 40 run. In the case where the remote hosted feed file has not been updated since the last run, the version cached in the local file system may be used. This will reduce the amount of network overhead to run the FUSELET 40. The feed files in the cache may be read into system memory as data structures and are ready for fusion.

Figure 10:
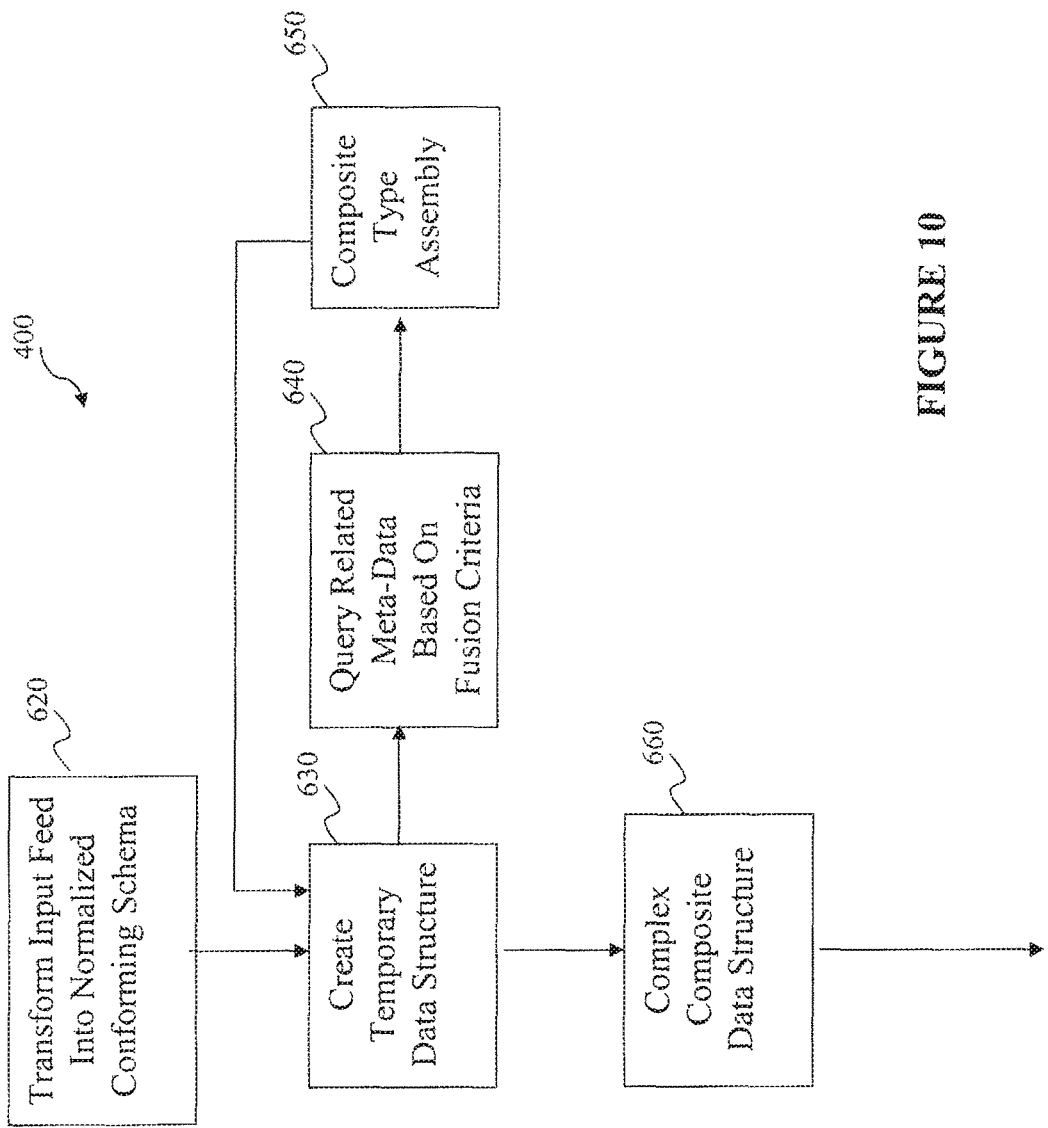
FIG. 10 is a more detailed flowchart of the process step in FIG. 2.

Referring now to FIG. 10, a more detailed flowchart of the process step 400 of FIG. 2 for the FUSELET 40 is shown. The FUSELET 40 may have a series of target information schema and a set of fusion criteria that drives the process to compose new feed elements from the input feed files. Typically, the input feed files come from different sources which are likely using independent and incompatible source schema. At step 620, in order to correlate related information elements from these different input feed files, the FUSELET 40 transforms each input feed file into a normalized, conforming schema. The elements in this schema may then be tagged with meta-data derived from the element's content. In step 630, the FUSELET 40 creates a temporary data structure to hold the new fused, composite elements. This temporary data structure is defined by the target information schema. In step 640, for each new element type within the temporary data structure, the FUSELET 40 uses the data type descriptions to query for related meta-data among the cached, normalized input feed structures in memory. In step 650, for each element from the normalized input feed files that correlates to the meta-data query, the FUSELET 40 reads relevant data from that input feed element and writes it to the new element in the temporary data structure. This is repeated for all the fusion criteria and for each new element type of the target schema. In step 660, the result is the complex composite data structure which is ready to be formatted in RSS, HTML, or XML. The method of formatting is described in FIGS. 6-9.

Thus, provided is a system for accumulating and presenting data in web-based content comprising a plurality of silos each having raw data, a plurality of feedlets that transforms the raw data of the plurality of silos into a plurality of high value data feeds, and at least one fuselet for receiving the plurality of high value data feeds to generate a complex composite data feed, wherein the complex composite data feed is in a web-accessible format and represents a fusion of the plurality of high value data feeds. In other embodiments, the plurality of feedlets transforms the raw data by extracting key pieces of information from the raw data and, expanding and correlating these key pieces of information. In other embodiments, each of the plurality of feedlets further comprises a configuration module that defines parameters for a location of each of the plurality of silos, a tagging scheme for the high value data feed, and an output format for the high value data feed and a standalone web server having a file system directory wherein the high value data feed is written to. The output format for the high value feed is of a type selected from a group consisting of a RSS feed, XML feed, and HTML feed.

In some embodiments, each of the plurality of feedlets is executed in a batch mode process to allow for current-status monitoring of the plurality of silos. In some embodiments, the plurality of high value data feeds are web browser accessible. In some embodiments, the complex composite data feed is web browser accessible. In some embodiments, the web-accessible format is of a type selected from a group consisting of a RSS feed, XML feed, and HTML feed. In some embodiments, the at least one fuselet is executed in a batch mode process to allow for current-status monitoring of the plurality of high value data feeds. In some embodiments, the at least one fuselet further comprises receiving at least one other RSS data feed available via the Internet and fusing this with the plurality of high value data feeds to generate the complex composite data feed.

In still other embodiments, the fusion of the plurality of high value data feeds to generate the complex composite data feed is based on a target information schema and a set of fusion criteria. In other embodiments, each of the plurality of feedlets communicates with at least one of the plurality of silos. In other embodiments, each of the plurality of silos communicates with at least one of the plurality of feedlets. In other embodiments, the system further comprising a second fuselet for receiving a plurality of complex composite data feeds to generate a second complex composite data feed, wherein the second complex composite data feed is accessible by a web browser and represents a fusion of the plurality of complex composite data feeds.

In another embodiment, a method for accumulating and presenting data in web-based content comprising communicating with a plurality of silos each having raw data, transforming, by a plurality of feedlets, the raw data of each of the plurality of silos into a plurality of high value data feeds, fusing, by at least one fuselet, the plurality of high value data feeds to generate a complex composite data feed, and publishing the complex composite data feed directly to the Internet. In other embodiments, transforming the raw content data further comprises configuring a temporary data structure according to a target data schema, extracting key pieces of information from the raw content data, expanding and correlating the key pieces of information, and inserting the expanded and correlated pieces of information into the temporary data structure. The target data schema is a target XML schema.

In some embodiments, the method further comprises loading configuration properties for each of the plurality of feedlets to define parameters for a location of each of the plurality of silos, a tagging scheme for the high value data feed, an output format for the high value data feed, and a file system directory for the high value data feed and loading configuration properties for the at least one fuselet to define parameters for a location of the plurality of high value data feeds, a tagging scheme for the complex composite data feed, a set of fusion criteria for the complex composite data feed, an output format for the complex composite data feed, and a file system directory for the complex composite data feed. The output format for the high value data feed and the complex composite data feed is of a type selected from a group consisting of a RSS feed, XML feed, and HTML feed.

In still other embodiments, the method further comprises receiving, by the at least one fuselet, at least one other RSS data feed available via the Internet and fusing this with the plurality of high value data feeds to generate the complex composite data feed. In other embodiments, the method further comprises fusing, by a second fuselet, a plurality of complex composite data feeds to generate a second complex composite data feed, wherein the second complex composite data feed is accessible by a web browser.

In still another embodiment, a computer readable medium comprising a plurality of instructions for execution by at least one computer processor, wherein the instructions are for interfacing with a plurality of input sources each having data, configuring a temporary data structure according to a target schema, selecting pieces of information from the data of each of the plurality of input sources and transforming these pieces of information into human actionable content, inserting the selected and transformed pieces of information into the temporary data structure, and generating an output data feed from the temporary data structure, wherein the output data feed is published directly to the Internet. In some embodiments, the plurality of input sources are legacy databases and transforming the selected pieces of information comprises expanding and correlating the selected pieces of information.

In other embodiments, the plurality of input sources emit a RSS data feed and transforming the selected pieces of information comprises correlating and fusing the selected pieces of information according to a set of fusion criteria. In other embodiments, the target schema is a target XML schema. In other embodiments, the output data feed is a type selected from a group consisting of a RSS feed, XML feed, and HTML feed.

Another embodiment includes a system and method for transforming event and temporal information within a computer system into digital content. The resulting content is suitable for inclusion into existing content management systems, web portals and web sites; XML based messaging, web systems, relational databases and publish/subscribe mechanisms. The source events can be received in real time, in batch, and is transformed into both human and machine readable content. Source events for this system can take the form of Direct Events, a high intensity set of data or activity surrounding a direct temporal occurrence and Synthetic Events, a low intensity set of data or activity surrounding a change of state of a monitored data source or sources and are detected through post processing and correlation.

To better illustrate the advantages and features of various embodiments, a particular description of several embodiments will be provided with reference to the attached drawings 11-17. These drawings, and other embodiments described herein, only illustrate selected aspects of the embodiments and do not limit the scope thereof. For example, "events" will generally be used to describe various occurrences, either instantaneously or over time. However, the events described are meant to encompass temporal data, instantaneous data reports, multiple data reports correlated over some dimension, representations of information, decision points, authorizations, authentications, facts, queries, and similar abstractions. Further, despite reference to specific features illustrated in the example embodiments, it will nevertheless be understood that these features are not essential to all embodiments and no limitation of the scope thereof is thereby intended. For example, some illustrated embodiments are described in reference to XML publishing systems, particularly RSS and ATOM-formatted data; however, other data formats and publishing systems are contemplated and no limitation of the scope is intended. Similarly, some embodiments are discussed as correlating over time; however, other correlations are possible and contemplated. Possible alterations, modifications, and applications of the principles described herein have been omitted for clarity and brevity; nevertheless, it is understood that such alterations, modifications, and applications are contemplated. Furthermore, some items are shown in a simplified form, and inherently include components that are well known in the art. Further still, some items are illustrated as being in direct connection for the sake of simplicity. Despite the apparent direct connection, it is understood that such illustration does not preclude the existence of intermediate components not otherwise illustrated.

As noted with reference to the FUSELETS and FEEDLETS above, data sources must frequently be correlated. Another embodiment correlates data not only between systems but along some dimension—most commonly, time. By evaluating the change in datasets over time, the underlying data can be given contextual significance. For clarity of description, various embodiments are described in terms of FUSELETS but may be equally applicable to FEEDLET S.

For ease of discussion, parts of the systems are described as "modules." These modules may be general-purpose, or they may have dedicated functions such as memory management, program flow, instruction processing, object storage, etc. The modules could be implemented in any way known in the art. For example, in one embodiment a module is implemented in a hardware circuit comprising custom VLSI circuits or gate arrays, off-the-shelf semiconductors such as logic chips, transistors, or other discrete components. One or more of the modules may also be implemented in programmable hardware devices such as field programmable gate arrays, programmable array logic, programmable logic devices or the like.

In another embodiment, one or more of the modules are implemented in software for execution by various types of processors. An identified module of executable code may, for instance, comprise one or more physical or logical blocks of computer instructions that may, for instance, be organized as an object, procedure, or function. Further, the executables of an identified module need not be physically located together, but may comprise disparate instructions stored in different locations that, when joined logically together, comprise the module and achieve the stated purpose for the module. A "module" of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Another embodiment uses higher-level components as modules. For example, a module may comprise an entire computer acting as a network node. A module may also comprise an off-the-shelf or custom program, such as a database management system. These higher-level modules may be decomposable into smaller hardware or software modules corresponding to different parts of a software program and identifiable chips (such as memory chips, ASICs, or a CPU) within a computer.

To better illustrate the general inventive principles, the system will be described relative to a particular embodiment that monitors one to several sources of events and conditions originating externally to the system. Where needed, the FUSELET correlates this information temporally and creates a Target set of RSS/RDF or ATOM-formatted data. This Target dataset is then provided to a data consumer. In one embodiment, the data written to a local file system and served by an HTML web server to consuming applications. In another embodiment, the Target data is transferred via a system call to another function operating in the same process space. In a third embodiment, the Target data is transferred via an IPC mechanism to another process on the same computer or within a cluster. A fourth embodiment uses a network-aware RPC mechanism to provide Target data to remote consumer. There is no limitation on the type of application that can function as a data consumer. Exemplary data consumers include CORBA ORBs, other FEEDLETS or FUSELETS, COM objects, DBUS endpoints, web browsers, server-side web portals, business to business integration hubs, and desktop applications.

A FUSELET module can operate standalone or be embedded into a larger application. FUSELET can also run continuously or be periodically "awakened" or run by a system execution scheduler like the UNIX cron daemon.

In one embodiment, FUSELETS operate upon two classes of temporal conditions and data, referred to as direct events and synthetic events. Direct events are simple conditions, messages or software signals that significant on their own. For example, different FUSELET embodiments may consume or respond to events defined by Web Service requests, Java Message Service events and messages, hardware faults, messages and interrupts, log file entries from a system process or web server, file transfer and messages delivered via a message bus such as IBM's MQ Series. Synthetic events are conditions or temporal occurrences derived by examining one or multiple data sources over time. For example, different FUSELET embodiments may consume or respond to events defined by changes in the value of a watched value beyond a specified range, such as the price of a stock or combination of values such as a group of commodity prices, the occurrence of any change of state or value within a specific limiting time window, the content of single or multiple information feeds in RSS, HTML or XML format, the combination of multiple raw events or the combination of multiple raw and synthetic events.

Figure 11:
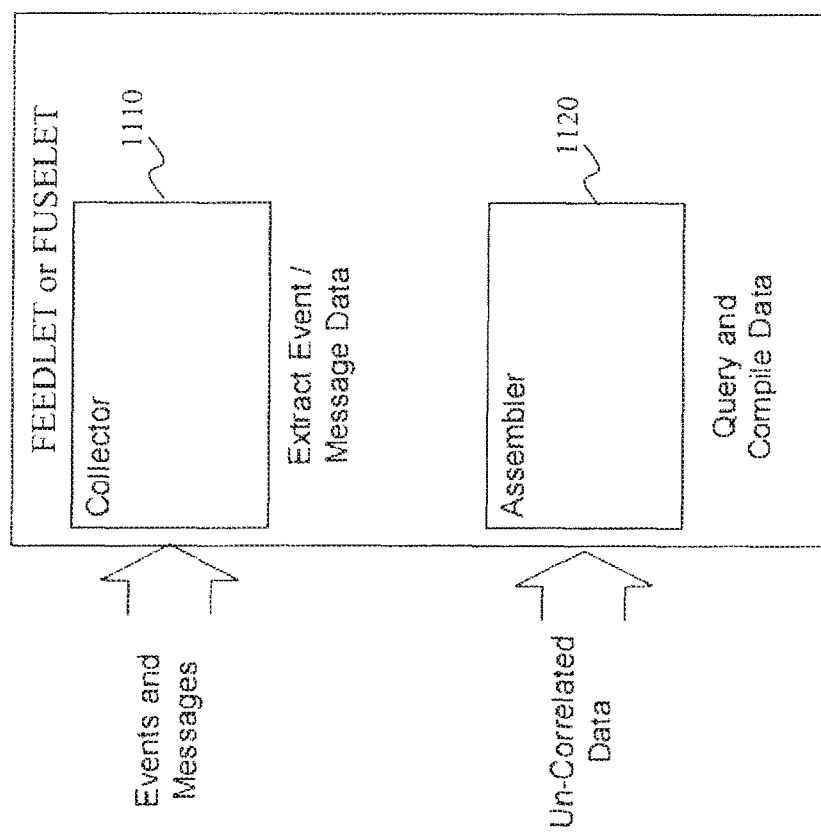
FIG. 11 is a block diagram of a two submodules of a system described relative to elements 20 or 40 of FIG. 1 according to one embodiment.

Referring now to FIG. 11, two submodules of a FEEDLET 20 or FUSELET 40 are shown according to one embodiment. The collector module 1110 interacts with one or more message sources to receive events. A FEEDLET or FUSELET can be defined with a single collector, with a single multi-purpose collector, or with multiple collectors. Each collector is written with an interface module capable of receiving messages from a particular system. For example, one embodiment receives messages from a Java Messaging Service (JMS). Another interface module allows the collector 110 to receive messages from an IBM MQ Series system. A third embodiment uses an interface to receive messages from a Web Services endpoint. A fourth embodiment receives messages from a COM, DCOM, D-Bus or ICE interface. A fifth embodiment has a sensor to receive messages concerning the operation of some piece of hardware, such as a hard drive, processor, or network card. A sixth embodiment uses kernel-level interfaces to receive information available to an operating system.

Internally, different collectors may specialize their implementation according to the type of information they will be collecting. For example, one hardware-monitoring collector 110 uses a polling architecture to check certain variables or values on a regular basis. A second collector 110 uses an asynchronous notification system such as FreeBSD's kqueue, Linux's epoll, or the "select" system call to receive messages. A third collector module 110 uses a proxy mechanism to detect messages going to some other component, which component may or may not know about the collector. For example, one embodiment uses a collector implemented as an HTTP or SOCKS proxy. The proxy receives and reports messages in a fashion transparent to the network traffic proxied. A fourth collector module uses an outside application to receive notifications, such as Growl for Mac OS X.

After receiving a message from some interface, the collector module 1110 extracts parameters and payload data associated with the message, as well as metadata about the message. The data and metadata derived from one or more messages are collected and grouped for additional processing by a different module.

The assembler module 1120 is a specialized collector module 1110 extended to create messages by interacting with other systems. For example, one embodiment performs queries against a data source such as relational databases. A second embodiment parses text or binary formatted files. A third embodiment performs GETs or POSTs against one or more URLs, where those URLs represent web services, web pages or other HTTP-accessible data. This data is filtered against a set of conditions and criteria, meta-data tagged and assembled for correlation and further processing. A variety of different implementations are possible, as already described relative to the collector module 1110. The operation of one embodiment of a collector module 1110 or assembler module 1120 has already been described above with reference to FIG. 4.

Figure 12:
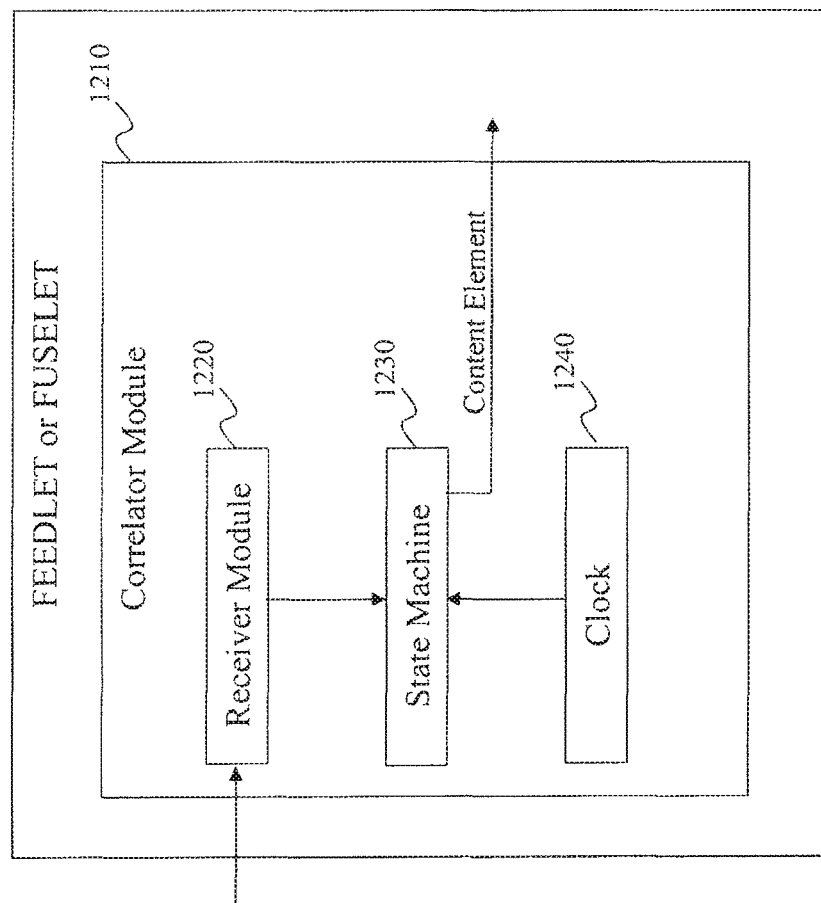
FIG. 12 is a block diagram of a submodule that performs the transformation and correlation described relative to the process step 400 of FIG. 2 according to one embodiment.

Referring now to FIG. 12, one embodiment of a FUSELET submodule that performs the transformation and correlation described relative to the process step 400 of FIG. 2. is shown. The correlator submodule 1210 assembles composite sets of data from the input provided by one or more collector modules 1110 or assembler modules 1120. In one embodiment, the correlation is guided by the values of the metadata associated with each data element. For example, one common piece of metadata associated with messages is the time received. The correlator 1210 uses the time received to temporally correlate the data within a certain time window or for a particular period length. Other correlative axes are contemplated, such as geo-spatial grouping, semantic grouping, and logical grouping. After correlation, one or more pieces of data are transformed into content elements for publication.

In one embodiment, the correlator module 1210 is implemented via a state machine. As each event is received by the receiver module 1220, the correlator examines its internal state 1230 and the event data. The event may then be ignored (effectively traversing a self-loop in the state diagram) or the internal state may be updated by incrementing a counter, moving to another state, etc. In one embodiment, a number of start and end states are determined. Each movement through the state machine from a start state to an end state results in the successful correlation of one piece of content. In a second embodiment, multiple state machines are used. The embodiment defines a number of subsets of the incoming events and each subset traverses its own state machine. In a third embodiment, the state transitions are time-constrained. In this embodiment, one or more internal clocks 1240 provide event information to the state machine once the initial events have been received. The state machine is defined so that a content element is produced only when the states in the machine are traversed in the correct order and within the correct amount of time.

Figure 13:
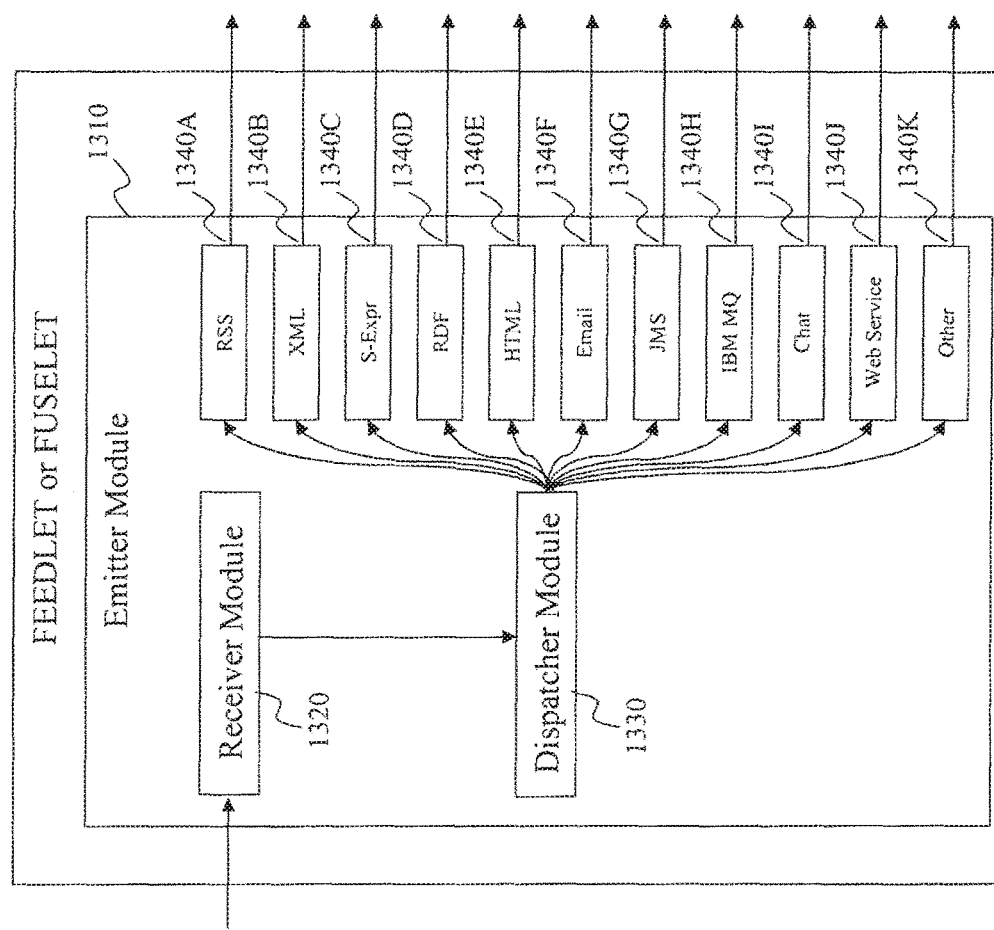
FIG. 13 is a block diagram of a submodule that performs the output feed generation described relative to the process step 500 of FIG. 2 according to one embodiment.

Referring now to FIG. 13, one embodiment of a FUSELET submodule that performs the output feed generation described relative to the process step 500 of FIG. 2. is shown. The submodule is referenced generally as the emitter module 1310. Within the emitter module 1310, the content item receiver module 1320 receives one or more content items from the correlator module 1310. The proper output formatter or formatters is chosen by the dispatcher module 1330, which sends the content item to a formatter module 1340. The formatter modules 1340 then use programmatic generation, string replacement, or content transformation to create an output format. Multiple output formats and formatters are contemplated. For example, one embodiment uses an RSS formatter module 1340A to create RSS-formatted data for output. A second embodiment uses an XML serializing module 1340B to create another XML-formatted data stream. A third embodiment uses an S-Expression module 1340C or RDF Triple formatting module 1340D. A fourth embodiment uses an HTML generation module 1340E. A fifth embodiment injects messages into other systems by defining modules corresponding to email (1340F), JMS messages (1340G), IBM MQ messages (1340G), email (1340H), chat messages (13401), or web service messages (1340J). Other embodiments create COM/DCOM, D-Bus, or Growl messages (1340K). The formatter modules can content using in parallel (encoding the same semantic content into multiple output formats) or sequentially (adding additional semantic data to an existing output format).

Figure 14:
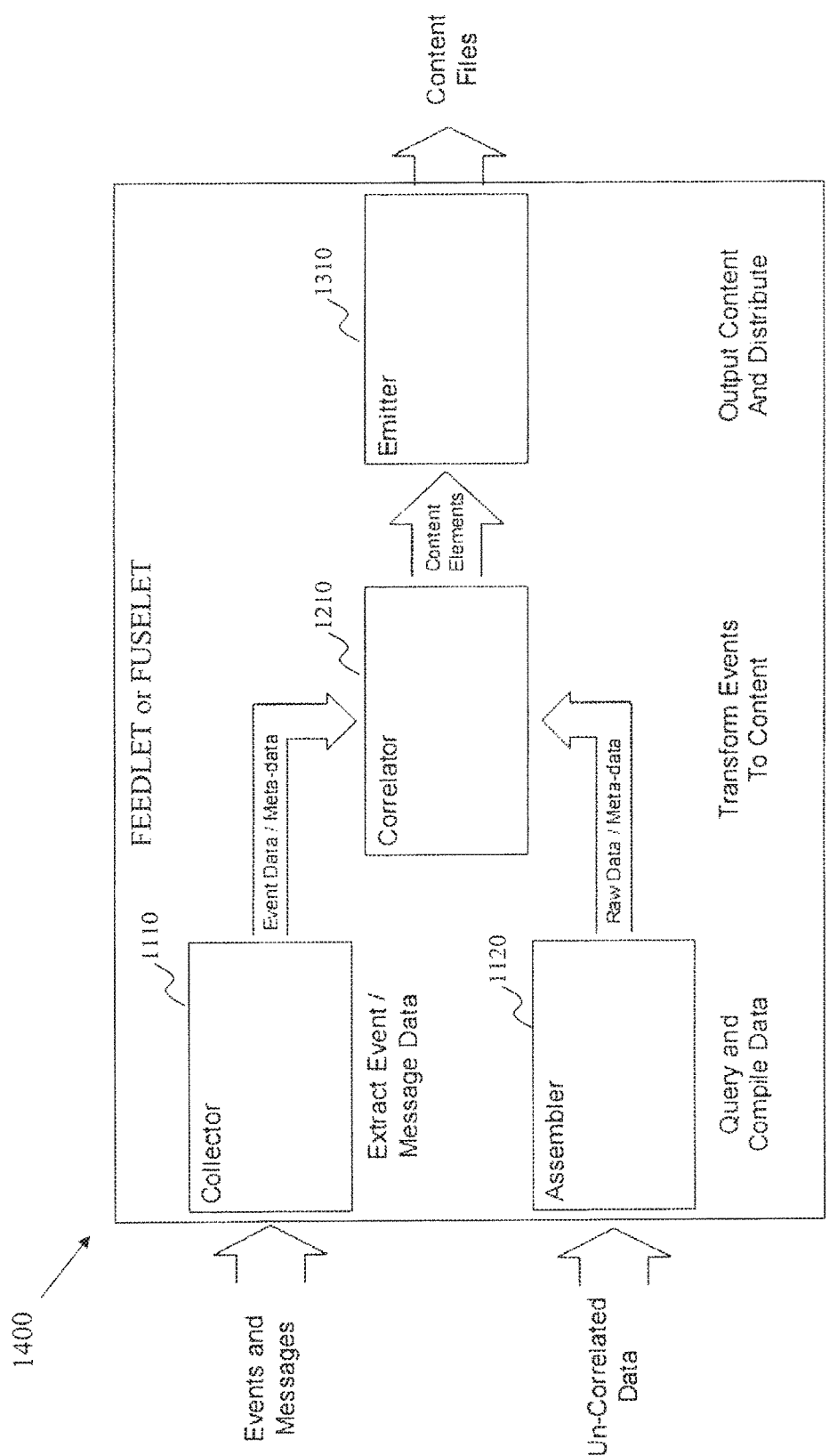
FIG. 14 is a block diagram of a FEEDLET or FUSELET system according to one embodiment.

Referring now to FIG. 14, one embodiment of a FEEDLET, FUSELET, or FUSELET system is shown. The combined system referenced generally at 1400 may be implemented across a single chip, as single system, or across multiple systems in a distributed fashion. Communication between the submodules in the combined system is implementation-dependent. Hardware implementations may use wire traces, fiber optics, radio signals, or other appropriate conductors to communicate between modules. Single-system implementations may, for example, use function calls or intrasystem IPC to communicate between modules. Exemplary distributed systems may use sockets or higher-level abstractions such as computing grids or tuple spaces to communicate.

Events and messages are received via a collector module 1110; other uncorrelated data is received via an assembler module 1120. The data and metadata output from the collector module 1110 and assembler module 1120 is transmitted to the correlator module 1210. After the correlator module has created a content element, a representation of that element is transmitted to the emitter module 1310. In some embodiments, the formatted content produced by the emitter module 1310 is periodically distributed to data consumers in the form of a "Feed." In one embodiment, the feed is a collection of content documents that are published to a web server, a file system, a content management system or a software messaging component and updated periodically, or as a result of direct input stimulus.

Figure 15:
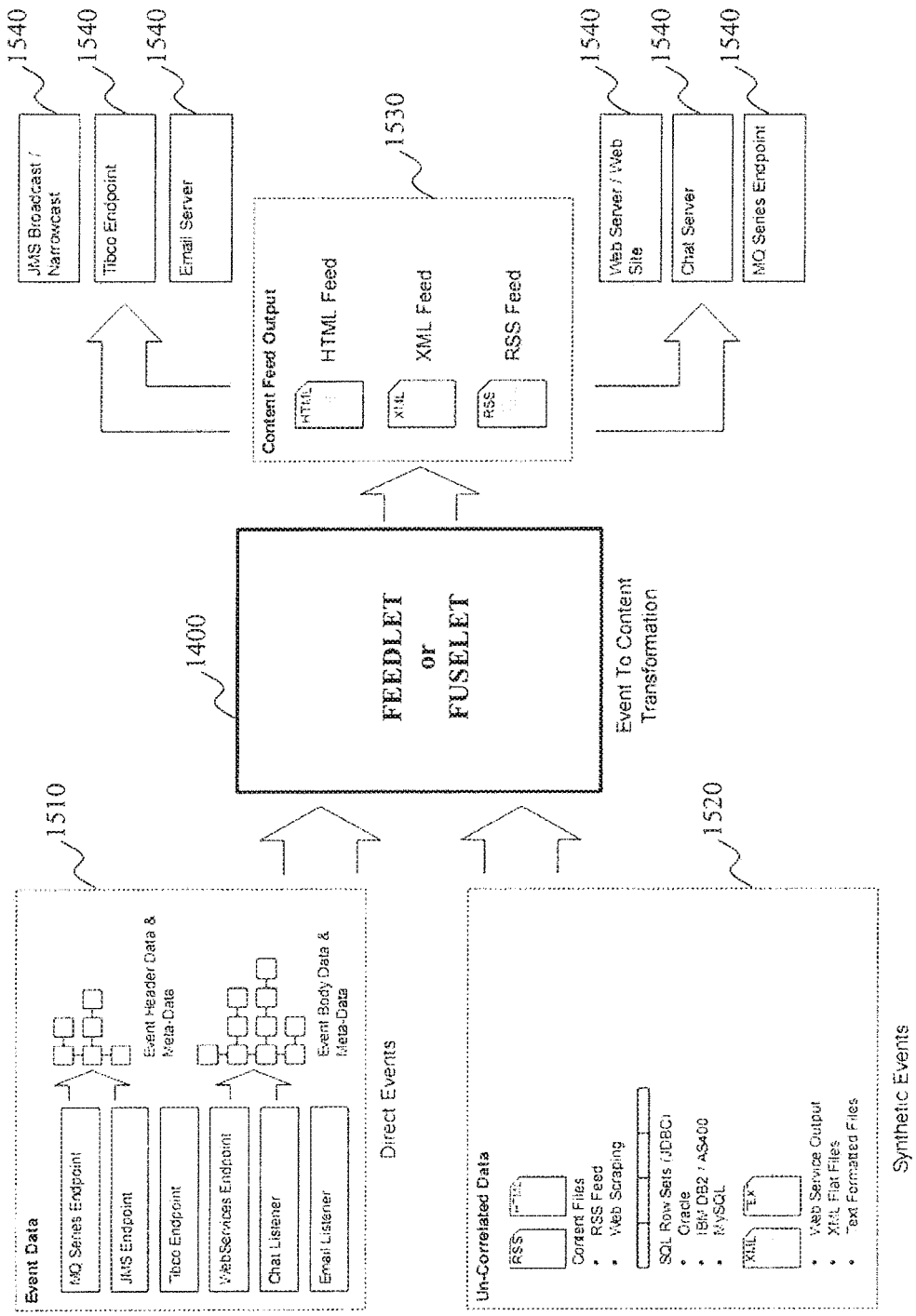
FIG. 15 is a block diagram showing the integration of a FEEDLET of FUSELET system according to one embodiment.

Referring now to FIG. 15, the integration of the combined system 1400 with outside systems is shown according to one embodiment. The combined system 1400 is represented by the black box labeled 1400. The box labeled 1510 is a direct event source. Events defined by either newly available information or a change in existing information are received by the combined system 1400. Exemplary message sources include other FEEDLETS or FUSELETS, JMS, TIBCO or MQ Series systems, chat and email listeners, and web service endpoints.

The box labeled 1520 is a synthetic event source. Exemplary synthetic event sources include any monitored data sources, including relational databases, web services interfaces, web pages, flat files in local or remote file systems and existing interfaces on applications within the network. The resulting data is processed immediately or stored via a persistence mechanism for later processing and correlation by the combined system 1400.

In this embodiment, the formatted content 1530 created by the combined system 1400 takes three forms: XML files representing the tagged information compiled and distilled by the combined system 1400, RSS files (with supporting graphic content) tagged and attributed containing human readable content summarizing the data and metadata surrounding the events consumed and processed, and HTML files structured to display information about the events. These files can be stored in a local file system, a remote file system, a relational database or a web server's document root. Other embodiments provide additional distribution channels as illustrated by the distribution boxes 1540. For example, other distribution channels can include wrapping the output XML in a new message body and sending it via message systems such as JMS, Tibco or MQ Series to remote system end points, enclosing the RSS or HTML content in an email message and sending to a list of subscribers for the particular topics or tags, sending the content via text message to a pager or cell phone, or relaying the content into a chat channel.

The combined system described in connection with FIG. 15 may be initialized as part of any FEEDLET or FUSELET system. For ease of description, FEEDLETS and FUSELETS will be used interchangeably. Unless a particular capability is stated to be unique to one particular class of combined systems, the capability may be present in any FEEDLET or FUSELET system. However, the capabilities discussed are specific to particular embodiments. It is specifically contemplated that any particular capabilities, structures, functions, processing steps, and other specifics may be omitted from other embodiments while still staying within the scope of the invention.

Figure 16:
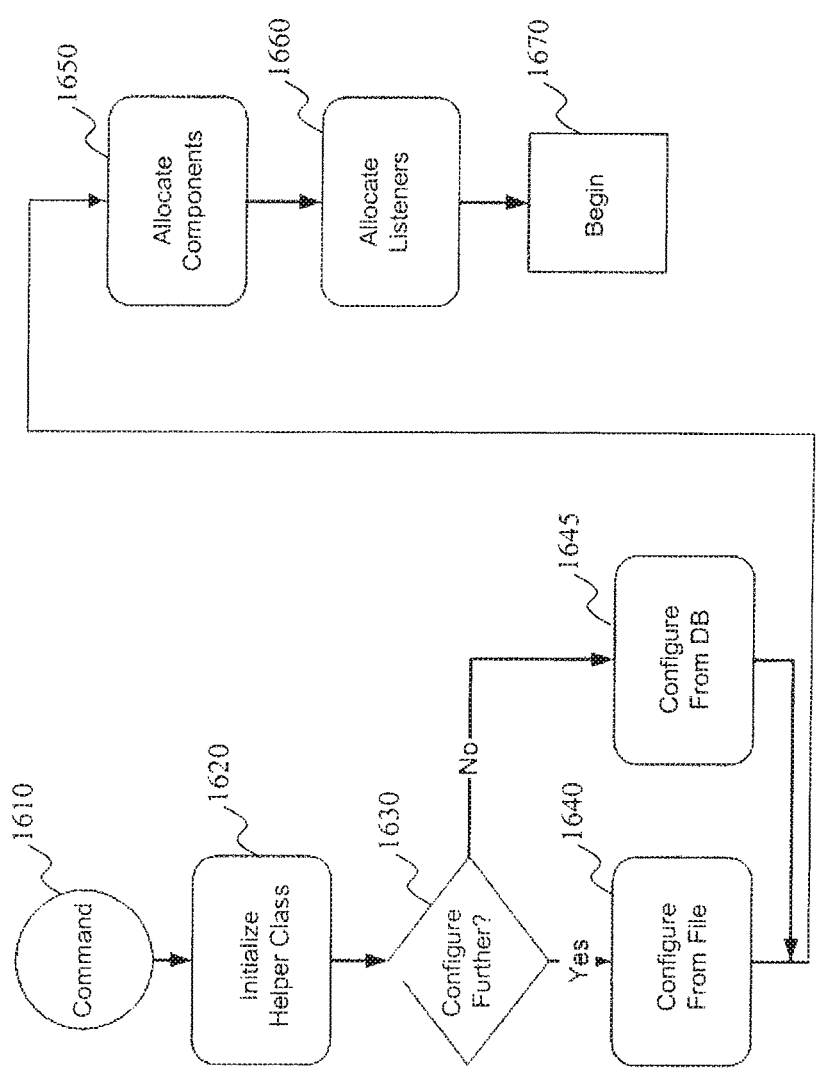
FIG. 16 is a more detailed flowchart of the process step 240 of FIG. 3 according to one embodiment.

Referring now to FIG. 16, a more detailed flowchart of the process step 240 of FIG. 3 is shown according to one embodiment. The process starts at 1610 with the command to initialize a particular FUSELET Helper Class, along with any needed data passed along from the higher-level configuration. At step 1620, the object representing the Helper Class is initialized in memory. In steps 1630-1645, the Helper Class may choose to load additional configuration information either from a configuration file, as illustrated in step 1640. Alternatively, configuration information may be loaded from another data source, such as a database, web-service, or other FEEDLET, as illustrated in step 1645. Other embodiments may not go through these additional configuration steps; sufficient configuration information may already be loaded as was described in connection with step 230 of FIG. 3. At step 1650, any additional components needed by the class may also be initialized and configured according to the configuration information provided. The type of additional components varies according to the information silo targeted. For example, in one embodiment, an additional component is a feed parser to receive information from other RSS feeds. In another embodiment, an additional component is a database connection. In a third embodiment, an additional component is a rules engine. At step 1660, any necessary listeners are initialized and configured. These listeners vary according to the implementation of the information silo targeted. One listener may be a socket listener. Another listener may be an HTTP proxy. Regardless of the information silo targeted, the allocation and configuration of additional components and listeners as described in connection with steps 1650 and 1660 should be sufficient to establish connections with the necessary information sources. At step 1670, the FUSELET begins operation. In one embodiment, connections are polled for data on a periodic basis. In a second embodiment, the collection of data is event-driven.

As discussed above relative to FIG. 1, FUSELETS may process data from different silos 10. This data may come as a message or information change to the FUSELET, referred to as a Direct Event, or it may come as a change in the information from a monitored source, referred to as a Synthetic Event. In one embodiment, direct events are discrete sets of data and meta-data activity surrounding a temporal system occurrence. For example, these may include data or messages that are recognizable as events to some other software or hardware entity. In other embodiments, direct events include classes of user activity such as using a web page to search for information or authenticating to a secure software system. In another embodiments direct events encompass activity from hardware and peripheral devices, such as a peripheral temperature sensor reading above or below a specific threshold level.

Synthetic events are discrete sets of data and meta-data activity surrounding a change of state of a monitored data source or sources. Synthetic events are forensically constructed by correlating information from one or more sources to indicate that an important condition has been met or threshold exceeded. Synthetic events can be generated by correlating information across multiple direct events, or multiple synthetic events, or combinations of the two. Synthetic events can also come from correlation from any set of existing content feeds. For example, one embodiment creates a synthetic event when a given stock price falls below a threshold and the ratio of gets to puts exceeds a given number.

Figure 17:
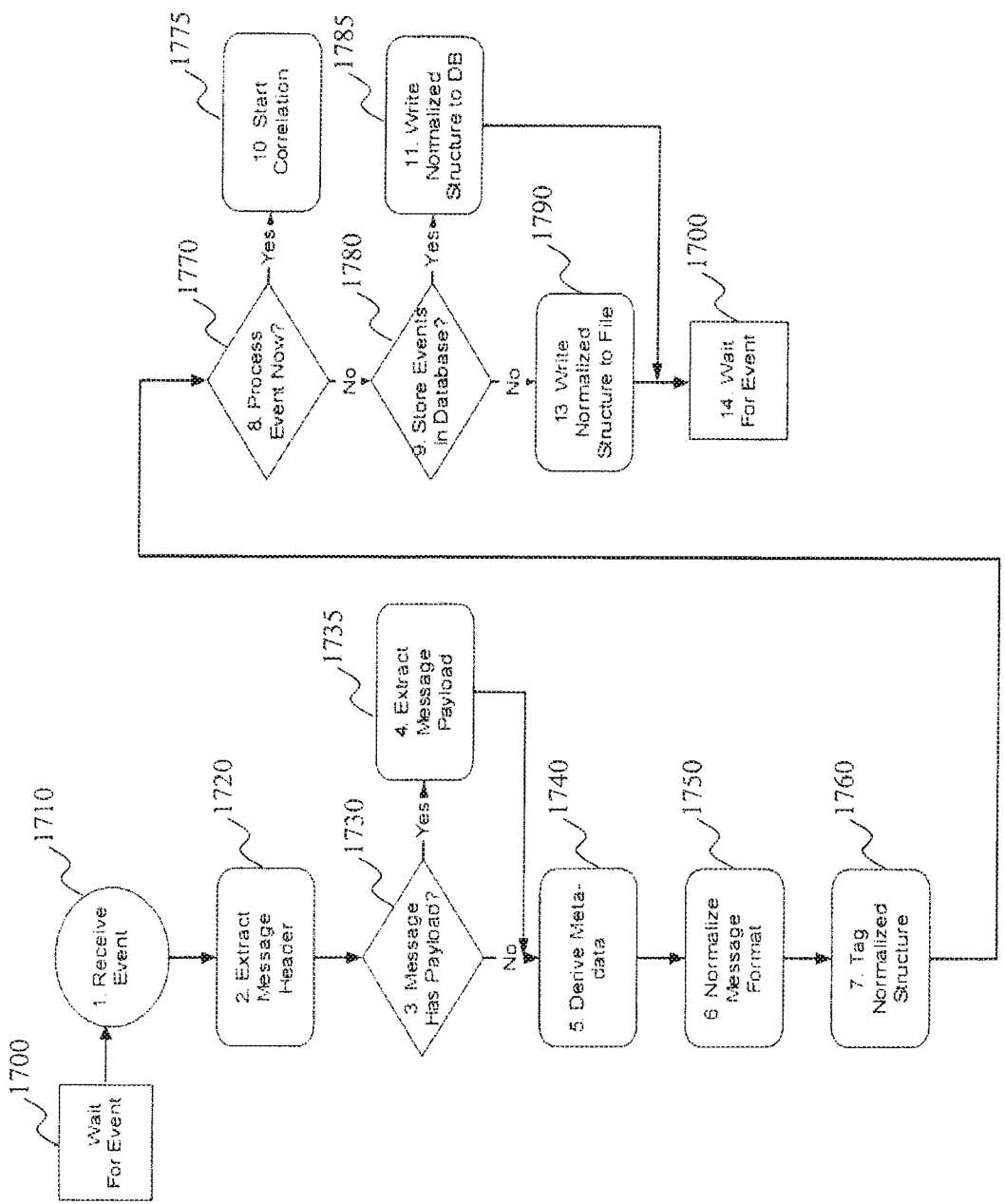
FIG. 17 is a more detailed flowchart of the process step 300 of FIG. 2 according to one embodiment.

Referring now to FIG. 17, a more detailed flowchart of the process step 300 of FIG. 2 is shown according to an alternative embodiment. At step 1700 the system is waiting for events or messages. At step 1710, a system that has been waiting receives a message from a monitored message source. For purposes of illustration only, the message is assumed to include a data payload as well as metadata about the message. At steps 1720-1760, the message is received by the system and processed into an interim data structure that packages the data and metadata associated with that event into a common format, regardless of event type or origin. At step 1720 the message header is extracted, if present. At step 1730, the message is analyzed for the presence of a payload. If a payload is present, the payload is extracted at step 1735. At step 1740, metadata about the message is derived. For example, the message receipt time is a derived metadata field. In another embodiment of step 1740, the metadata associated with the message is extracted from the message and not derived. A third embodiment of step 1740 derives some metadata and extracts other metadata. At step 1750, necessary processing and transformation takes place to move the vendor-specific data into a conforming neutral format. At step 1760 the conforming neutral format is tagged appropriately for consumption by later stages of the system.

In step 1770, the system decides whether to process the message in the conforming neutral format immediately or whether to store the message for later processing. If the message should be processed immediately, the message is passed to the next stage of the system in step 1775. The system then returns to step 1700 to wait for another message or event.

In an alternative embodiment, the message is stored. At step 1780, the system decides whether to store the message in a database or in a file. If the message is to be stored in a database, a normalized structure representing the message is written to the database in step 1785. Otherwise, a normalized structure representing the message is written to a file in step 1790. The system then returns to step 1700 to wait for another message or event.

Referring now to FIG. 18, a more detailed flowchart of the process steps 320-350 of FIG. 4 is shown according to one embodiment. At step 1800 the system is waiting for an activation message. In one embodiment, this activation method comes from an event or scheduler outside the system, such as the UNIX at, init, or cron daemons. In another embodiment, the activation message comes from another part of the system. At step 1810, the activation message is received and assembly begins. At step 1820 the system loads an assembly plan to guide the assembly. In one embodiment, the assembly plan is represented as text or structured binary data in an additional configuration file that is loaded and parsed. In a second embodiment, the assembly plan is hardcoded into a function. In a third embodiment, the assembly plan is a declarative statement passed to the assembly module. For purposes of illustration only, assume an embodiment where the assembly plan describes the steps for connecting to and performing a query in a legacy database. In such an embodiment, the system allocates a data agent at step 1822 to perform the query. Any query parameters are loaded at step 1824, and the query is performed at step 1826. Because an embodiment may assemble data from more than one source, all agents are queried for their status at step 1828. If necessary, the system either waits for all agents to complete, allocates a new agent, or stores the query result and reuses an existing agent until all data sources specified in the assembly plan have been consulted. Other embodiments may query different sources. For example, other embodiments query webservice end points, multiple databases, or make calls to application programming interfaces (APIs). At steps 1830-1850, the data retrieved via the assembly queries is processed into an interim data structure that packages the data and metadata associated with that information into a common format, regardless of the data type or origin. At step 1830, metadata about the message is derived. This metadata may be derived from the circumstances of the assembly, from data retrieved during the assembly or may come from the assembly plan. At step 1840, necessary processing and transformation takes place to move the vendor-specific data and the derived metadata into a conforming neutral format. At step 1850 the conforming neutral format is tagged appropriately for consumption by later stages of the system. In one embodiment, the assembled information can then be stored or send to the correlator module for processing as described in association with step 1870.

In a second embodiment, the system continues with step 1860, wherein the information contained in the conforming neutral format is examined to see if it qualifies as an interesting event. If the information is deemed interesting according to some set of criteria, the information in the conforming neutral format can be transformed into a synthetic event at step 1863 and re-tagged if necessary at step 1866. The synthetic event can then be stored or send to the correlator module for processing as described in association with step 1870.

In step 1870, the system decides whether to process the neutral format event or information immediately or whether to store the message for later processing. If the neutral format event or information should be processed immediately, the synthetic event or information is passed to the next stage of the system in step 1875. The system then returns to step 1800 to wait for another activation messages.

In an alternative embodiment, the synthetic event or information is stored. At step 1880, the system decides whether to store the synthetic event or information in a database or in a file. If the synthetic event or information is to be stored in a database, a normalized structure representing the synthetic event or information is written to the database in step 1885. Otherwise, a normalized structure representing the synthetic event or information is written to a file in step 1890. The system then returns to step 1800 to wait for another message or event.

For an FUSELET that monitors changes in data sources to derive a synthetic event, the Assembler will execute when triggered by the management interface. The Assembler is controlled by a configuration file that contains an assembly plan. In response to this plan the Assembler will allocate modules that perform query and filtering operations, connecting to at least one and possibly several data sources. In the simple case this will be a single defined data source such as a relational data base (RDBMS). In more complex cases this could include WebServices end points, a set of relational data bases, and calls to existing application programming interfaces (APIs) over communications means such as sockets, common object request broker (CORBA) and Java 2 enterprise edition (J2EE). Some data processing and transformation takes place in this stage of execution to insure that any missing meta-data is derived and that all payload/synthesized event data is transformed into the conforming neutral format. This normalized, attribute tagged collection of data structures are used as input to the second stage of processing, correlation and content formation.

Referring briefly again to FIG. 5, different embodiments may pursue different correlation strategies. Referring to process step 440, one embodiment forces received data structures to undergo further data and structure normalization to ensure that data elements such as time, event source, event type conform to a standard lexicon. After normalizing data across both structures are compared and tagged with a set of tags that have matching semantic context, ensuring any derived or explicit attributes are exposed and aligned for correlation. Another embodiment uses an externally defined, run-time-loaded correlation plan to create a single output data structure derived from one to several input structures. A third embodiment uses the metadata to guide correlation. A fourth embodiment subjects the received data structures to logical operations such as AND, NOT and OR based on their contents. A fifth embodiment uses probabilities to correlate structures. A sixth embodiment uses semantic content such as synonyms or theme grouping to correlate content. A seventh embodiment uses temporal conditions, such as time windowing or period length to correlate content. An eighth embodiment uses geo-spatial information to correlate content.

Referring briefly again to FIG. 6, the output formats described in FIGS. 6-9 are merely exemplary; additional embodiments transform the information produced by the system into different output formats. For example, one embodiment outputs information as an email message. A second embodiment outputs information as an SMS message. A third embodiment outputs information as a chat message. Other embodiments may target a telephone/paging system or an enterprise message service such as JMS or MQ series. Further embodiments may produce more than one output for the same information.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

We claim:

1. A method for communicating data, comprising:
customizing a first content transformation agent for a first source data repository that stores first source data;
providing, to the first source data repository, the first content transformation agent for the first source data repository,
customizing a second content transformation agent for a second source data repository that stores second source data;
providing, to the second source data repository, the second content transformation agent for the second source data repository,
in accordance with the customization of the first content transformation agent, constructing a first first-stage data feed in a neutral format by dynamically selecting and transforming, within the first source data repository, selected first source data into the first first-stage data feed in the neutral format, the first first-stage data feed comprising the selected first source data stored originally in the first source data repository,
in accordance with the customization of the second content transformation agent, constructing a second first-stage data feed in the neutral format by dynamically selecting and transforming, within the second source data repository, selected second source data into the second first-stage data feed in the neutral format, the second first-stage data feed comprising the selected second source data stored originally in the second source data repository;
sending the first first-stage data feed and the second first-stage data feed to an aggregation agent; and
generating, by the aggregation agent and based on criteria specified by a user, a second stage data feed as a composite of selected first source data from the first first-stage data feed and selected second source data from the second first-stage data feed.

2. The method of claim 1, further comprising:
providing the first first-stage data feed and the second first-stage data feed to a file system managed by a web server.

3. The method of claim 2, further comprising:
sending the second stage data feed based on a request via a web browser.

4. The method of claim 1, further comprising:
repeatedly updating, by the first content transformation agent and the second content transformation agent, the first first-stage data feed and the second first-stage data feed, respectively.

5. The method of claim 1,
wherein the second stage data feed is output via a website.

6. The method of claim 5,
wherein data in the first source data repository is independent of data in the second source data repository.

7. The method of claim 6,
wherein data in the first source data repository is formatted incompatibly with data in the second source data repository.

8. The method of claim 1, further comprising:
repeatedly updating the second stage data feed.

9. The method of claim 8, further comprising:
monitoring the first first-stage data feed and the second first-stage data feed, and updating the second stage data feed based on the monitoring upon detecting a predetermined event in either of the first first-stage data feed and the second first-stage data feed.

10. The method of claim 1,
wherein data in the first data source is in a first format that is a non-syndication format;
wherein data in the second data source is in a second format that is a non-syndication format; and
wherein the second stage data feed is in a third, neutral format.

11. The method of claim 1,
wherein the second stage data feed is generated by detecting relationships among the selected first source data and the selected second source data, and
wherein the second stage data feed comprises related selected first source data and selected second source data from the first-stage data feeds.

12. The method of claim 11, further comprising:
using a detected relationship among the detected relationships to query for and retrieve matching selected first source data and selected second source data from the second stage data feed.

13. The method of claim 1,
wherein the aggregation agent generates the second stage data feed using geo-spatial information by correlating geo-spatial information in the first first-stage data feed and the second first-stage data feed.

14. The method of claim 1,
wherein the aggregation agent generates the second stage data feed using temporal information by correlating temporal information in the first first-stage data feed and the second first-stage data feed.

15. The method of claim 1,
wherein the aggregation agent generates the second stage data feed using metadata contained in the first-stage data feed.

16. The method of claim 1,
wherein the aggregation agent generates the second stage data feed using a plan loaded dynamically based on a request from the user.

17. The method of claim 1,
wherein the aggregation agent comprises computer readable instructions stored on a recordable medium,
wherein the computer readable instructions for the aggregation agent, when executed by a processor, correlate selected source data from more than one source data repository.

18. The method of claim 1,
wherein the neutral format comprises a syndication format, and
wherein the first first-stage data feed and the second first-stage data feed are transformed into the neutral format from multiple different first non-syndication formats.

19. A communication method, comprising:
providing a first content transformation agent, adapted for a first source data repository that stores first source data, to the first source data repository;
providing a second content transformation agent, adapted differently than the first content transformation agent for a second source data repository that stores second source data, to the second source data repository;
transforming, at the first source data repository, the first source data into transformed first source data,
transforming, at the second source data repository, the second source data into transformed second source data;
sending, from the first source data repository, a first first-stage data feed in a neutral format by dynamically selecting, within the first source data repository, transformed first source data of the first source data;
sending, from the second source data repository, a second first-stage data feed in the neutral format by dynamically selecting, within the second source data repository, transformed second source data of the second source data;
receiving the first first-stage data feed and the second first-stage data feed by an aggregation agent; and
generating, by the aggregation agent and based on criteria specified by a user, a second stage set of data selected from the first first-stage data feed and the second first-stage data feed for presentation to the user.

20. The method of claim 19, further comprising:
detecting relationships among the selected transformed first source data and transformed second source data;
using a detected relationship among the detected relationships to query for and retrieve matching selected transformed first source data and selected transformed second source data from the second stage set of data,
wherein the second stage set of data comprises related selected transformed first source data and selected transformed second source data from the first-stage data feeds.

* * * * *